May 17, 1932.　　A. B. MODINE　　1,858,839
HEATING UNIT
Original Filed April 7, 1923
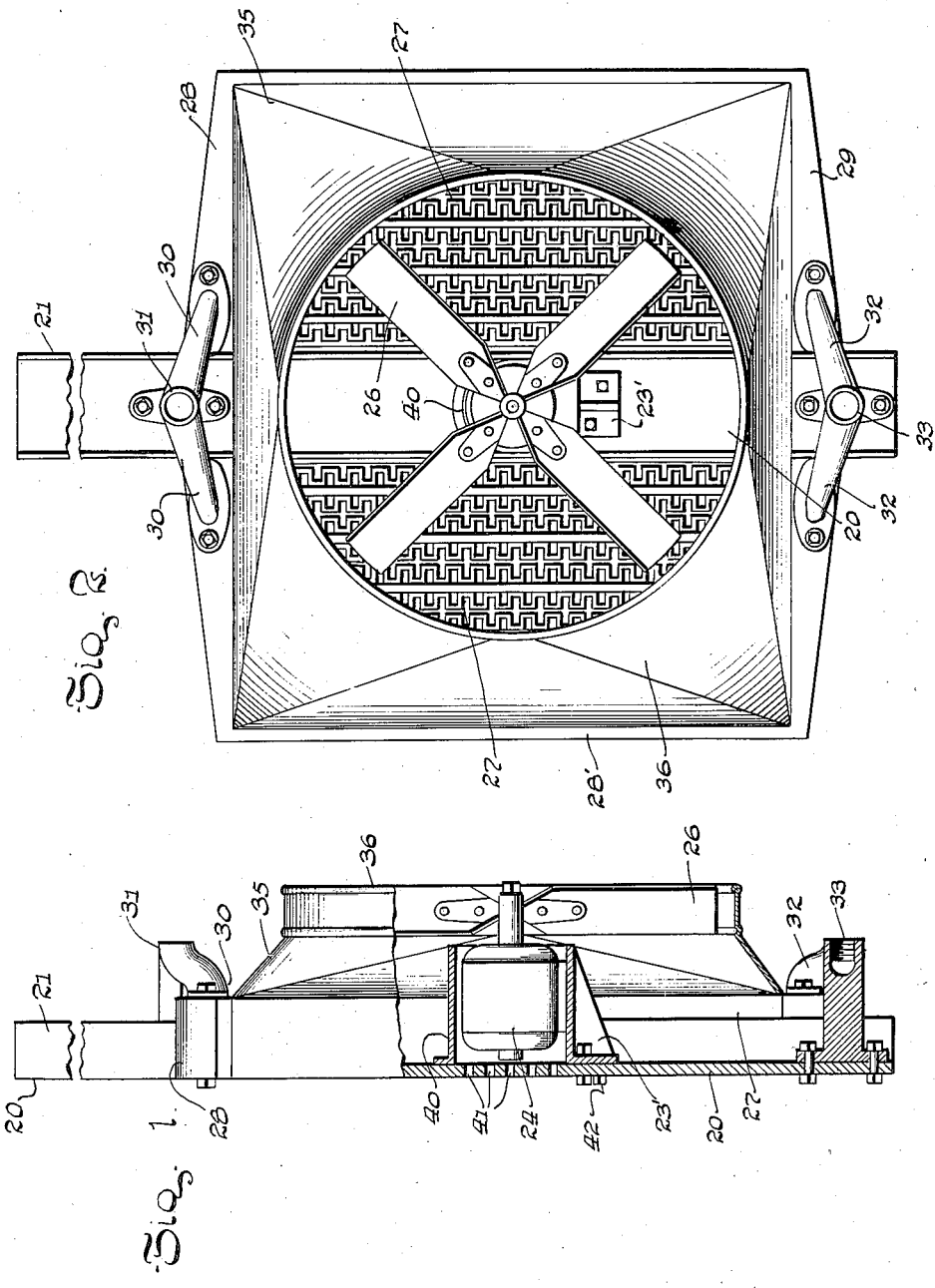

Patented May 17, 1932

1,858,839

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

HEATING UNIT

Original application filed April 7, 1923, Serial No. 630,617. Divided and this application filed April 20, 1928. Serial No. 271,493.

My invention belongs to that general class of devices known as heating apparatus, and relates particularly to a heating unit adapted to be used in shops, factories, garages, storage warehouses and such other places as the same may be applicable, this application being a division of my allowed application, Serial No. 630,617, filed April 7, 1923, Patent No. 1,666,907, issued April 24, 1928.

The invention has among its other objects the production of a device of the kind described that is simple, compact, convenient, of light weight, durable, efficient and satisfactory, and which may be installed at any desired point. More particularly it has as an object the production of an efficient, inexpensive and light weight unit, which may be attached to a wall or suspended or mounted on a suitable base, and which will have great capacity. It also has among its further objects the production of a device in which a circulator is employed which may be motor driven and in which the motor is entirely out of the current of heated air, whereby the same will not overheat but will, as a matter of fact, be maintained cool.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a vertical sectional view of a device embodying my invention; and

Fig. 2 is a front elevation of the device shown in Fig. 1.

In the drawings, wherein I have illustrated a preferred embodiment of my invention, there are shown heating units of any suitable size and shape, preferably in the form of radiators 27 similar to the well-known types of automobile radiators. These heating units are supported by a suitable base plate or hanger which, in this particular embodiment, comprises a channel 20 provided with side flanges 21. The heating units are secured at either side of the base plate and communicate with tanks or chambered ends or receptacles 28 and 29 which may be connected by side pieces 28'. Arranged at the top and bottom of the heating units are ports for the admission and discharge of a heating medium such as hot water, steam, or the like. The upper port 31 is in a chambered member provided with connecting conduits 30 communicating with the tank 28, while the lower port 33 is provided with a similar portion having communicating ducts 32 connected with tank 29.

The plate 20 carries a bracket 23' attached thereto by bolts 42, or the like, and disposed opposite apertures 41 provided in the base plate. On this bracket 23' is mounted a motor 24, preferably an electrical motor of any suitable design, on the shaft of which is mounted a fan 26 adapted to draw air through the heating units and apertures 41. This fan is provided with any desired number of blades of the desired configuration. A shield 40 is arranged to surround the motor 24.

A casing or shield 35 is so arranged about and enclosing the discharge end of the heating unit that the air is drawn to and through the units, heated and discharged through the outlet end 36.

The embodiment of my invention which I have here illustrated is especially light and compact, and operates with a minimum of vibration as a result of the extremely short fan shaft. The motor is maintained in a cool condition at all times as a result of its being disposed opposite the apertures 41 whereby cool air is continuously being drawn over it, and because of its being disposed within the casing 40, which protects it from the hot air issuing from the heating units.

It is obvious that the entire unit may be attached to a wall, or suspended, or mounted on a suitable base.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A heat exchange unit comprising spaced radiators arranged in the same plane, a support for said radiators located in said space, a motor, a fan driven by said motor for advancing independent columns of air through said radiators, said motor and said fan being positioned on the same side of said plane.

2. A heat exchange unit comprising spaced radiators arranged in the same plane, a motor, a fan driven by said motor for advancing independent columns of air through said radiators, said motor and said fan being positioned on the same side of said plane, and common means located in the space between the radiators for supporting said radiators and said motor and said fan.

3. A heat exchange unit comprising a radiator, means disposed entirely to one side of said radiator for advancing air therethrough, means at one side and extending longitudinally of said radiator for supporting said radiator and said air advancing means from an overhead support, and a hollow member secured to said supporting means for supplying fluid to said radiator.

4. A heat exchange unit comprising a radiator, means disposed entirely to one side of said radiator for advancing air therethrough, common means arranged longitudinally of said radiators for supporting said radiator and said air advancing means, said radiator being attached to said supporting means, and a hollow member secured to said supporting means and communicating with said radiator whereby fluid may be supplied to said radiator.

5. A heat exchange unit comprising a frame, spaced radiators mounted in said frame, common means carried by said frame for advancing independent columns of air through said radiators, means projecting upwardly from said frame for suspending said frame from an overhead support, and a manifold carried by said frame for supplying fluid to said radiators.

6. A heat exchange unit comprising a frame, a radiator carried by said frame, a motor, a fan driven by said motor for advancing air through said radiator, said motor and said fan being disposed on the same side of said radiator, tubular means secured to said frame for supplying fluid to said radiator, and said frame having means projecting upwardly therefrom for suspending it from an overhead support.

7. A heat exchange device comprising spaced radiators, a member providing a support for said radiators, said member being located in said space, a motor and air advancing means connected for operation by said motor, said means and motor being connected to the support, and said support having means for ventilating said motor.

8. A heat exchange device comprising a support, radiators arranged upon opposite sides of the support, air advancing means including a motor for advancing air through said radiators, said means being mounted upon said support, a housing for the motor, and means for ventilating said motor housing.

9. A heat exchange device comprising a support, radiators arranged upon opposite sides of the support, air advancing means including a motor for advancing air through said radiators, said air advancing means being arranged upon one side of the support, and said support having an opening providing means for ventilating the motor of said air advancing means.

10. A heat exchange device comprising a support, radiators arranged upon opposite sides of the support, air advancing means including a motor for advancing air through said radiators, a motor support and housing supported by said support upon the same side of the first mentioned support, said first mentioned support being apertured adjacent the housing to provide means for ventilating the housing.

11. A heat exchange device comprising a support, radiators arranged upon opposite sides of the support, a hood projecting from one side of the radiators, air advancing means including a motor secured to the support, said air advancing means being located in said hood, and means provided in said support for ventilating said motor.

12. A heat exchange unit comprising spaced radiators, common means for advancing independent columns of air through said radiators, and common means for supporting said radiators and said air advancing means, said supporting means being located in the space between the radiators.

13. A heat exchange unit comprising a radiator, means disposed at one side of said radiator for advancing air therethrough, means at one side and extending longitudinally of said radiator for supporting said radiator and said air advancing means, and a member extending from said radiator providing a housing for an element of the air advancing means through which air is advanced relatively to said radiator.

14. A heat exchange unit comprised of spaced radiators, means disposed in the space between said radiators for supporting said radiators from an overhead support, air advancing means supported by said means, and a member extending from said radiators providing a housing for an element of the air advancing means through which air is advanced relatively to said radiators.

In testimony whereof, I have hereunto signed my name.

ARTHUR B. MODINE.